F. P. MILLER.
ICE CREAM MAKING MACHINE.
APPLICATION FILED JUNE 17, 1918.
1,352,984.
Patented Sept. 14, 1920.
3 SHEETS—SHEET 1.
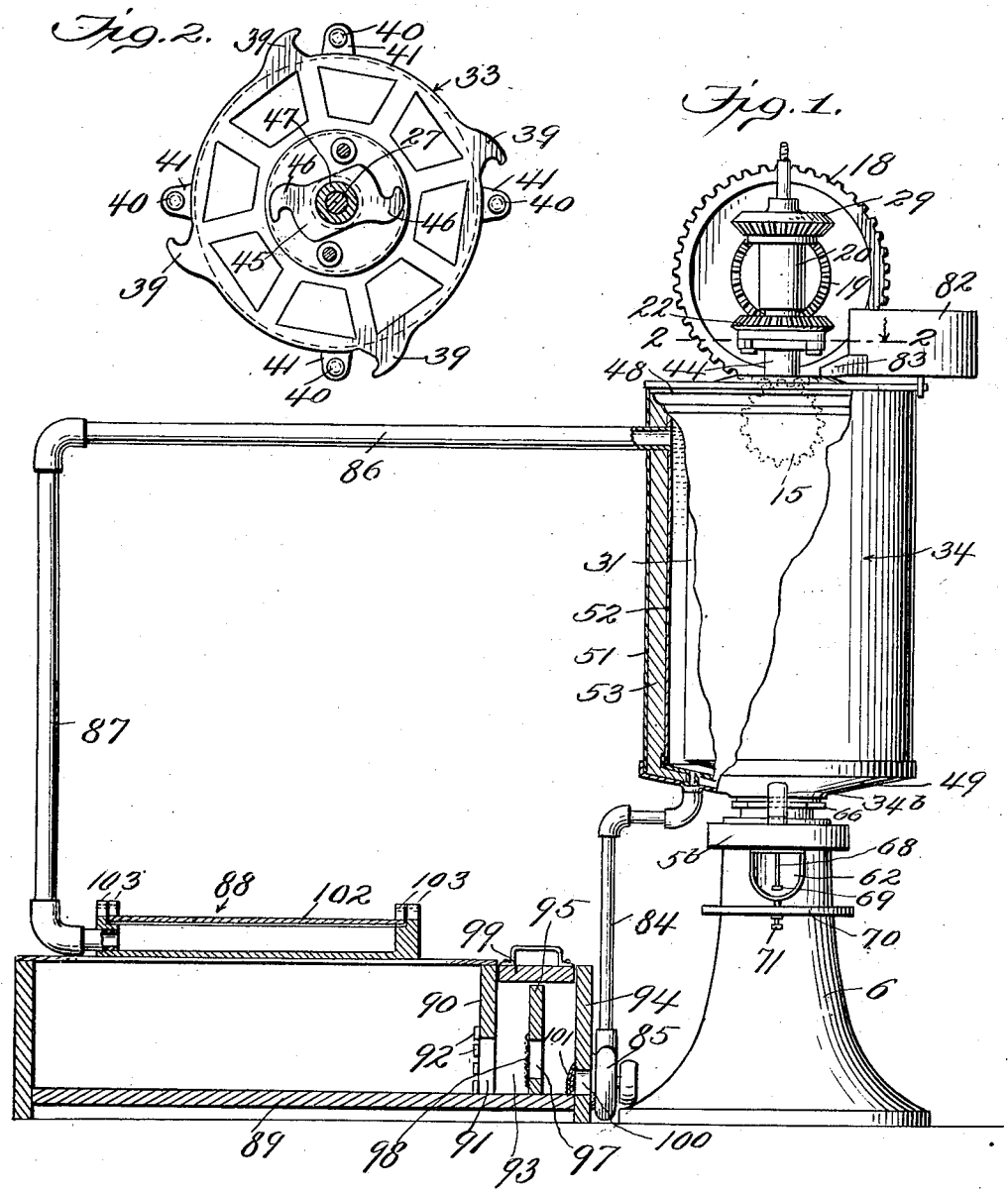
Witness
Chas. S. Hoyer
Inventor
Franklin P. Miller
By
Attorney F. P. MILLER.
ICE CREAM MAKING MACHINE.
APPLICATION FILED JUNE 17, 1918.
1,352,984.
Patented Sept. 14, 1920.
3 SHEETS—SHEET 2.
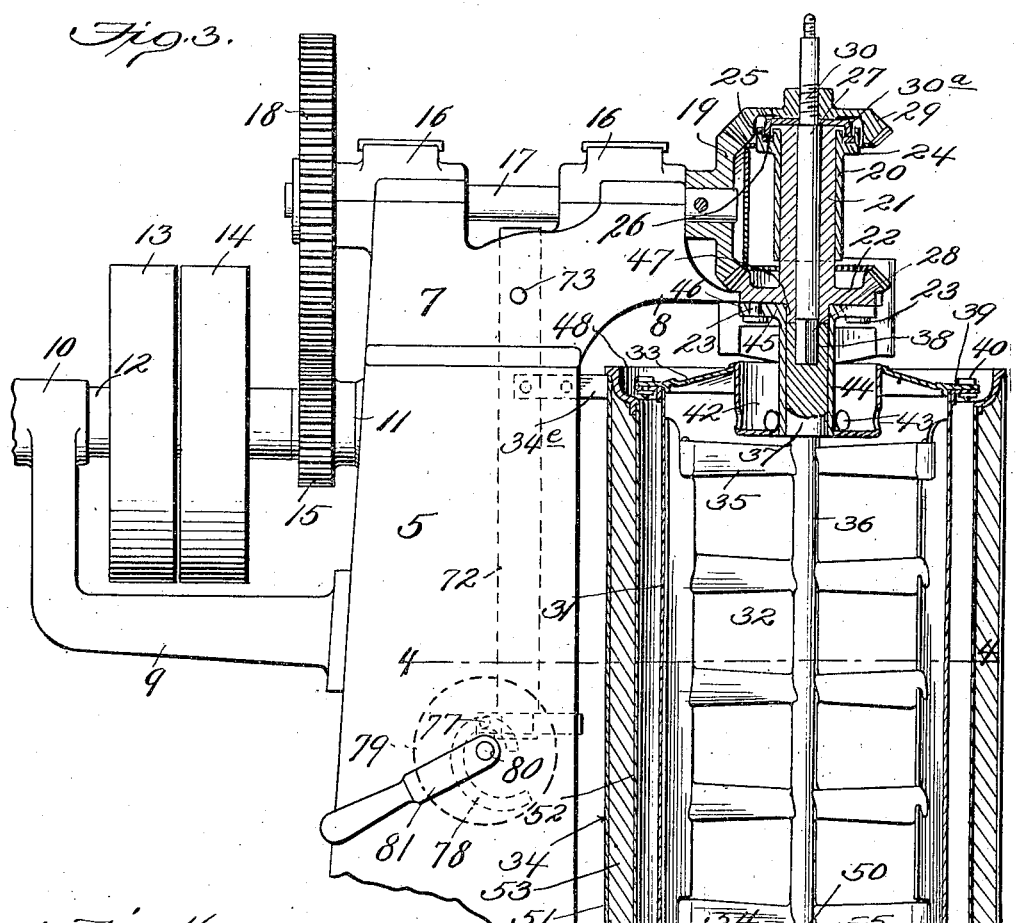
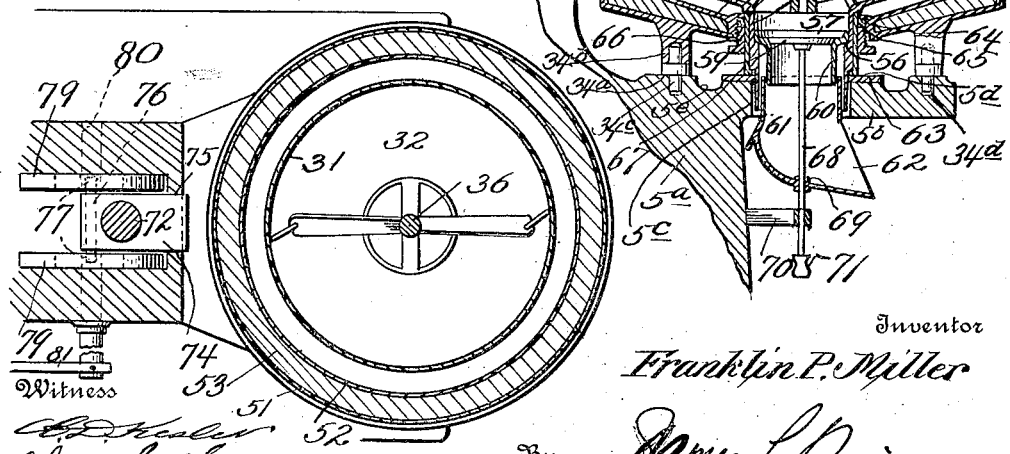
Inventor
Franklin P. Miller
Attorney F. P. MILLER.
ICE CREAM MAKING MACHINE.
APPLICATION FILED JUNE 17, 1918.
1,352,984.
Patented Sept. 14, 1920.
3 SHEETS—SHEET 3.
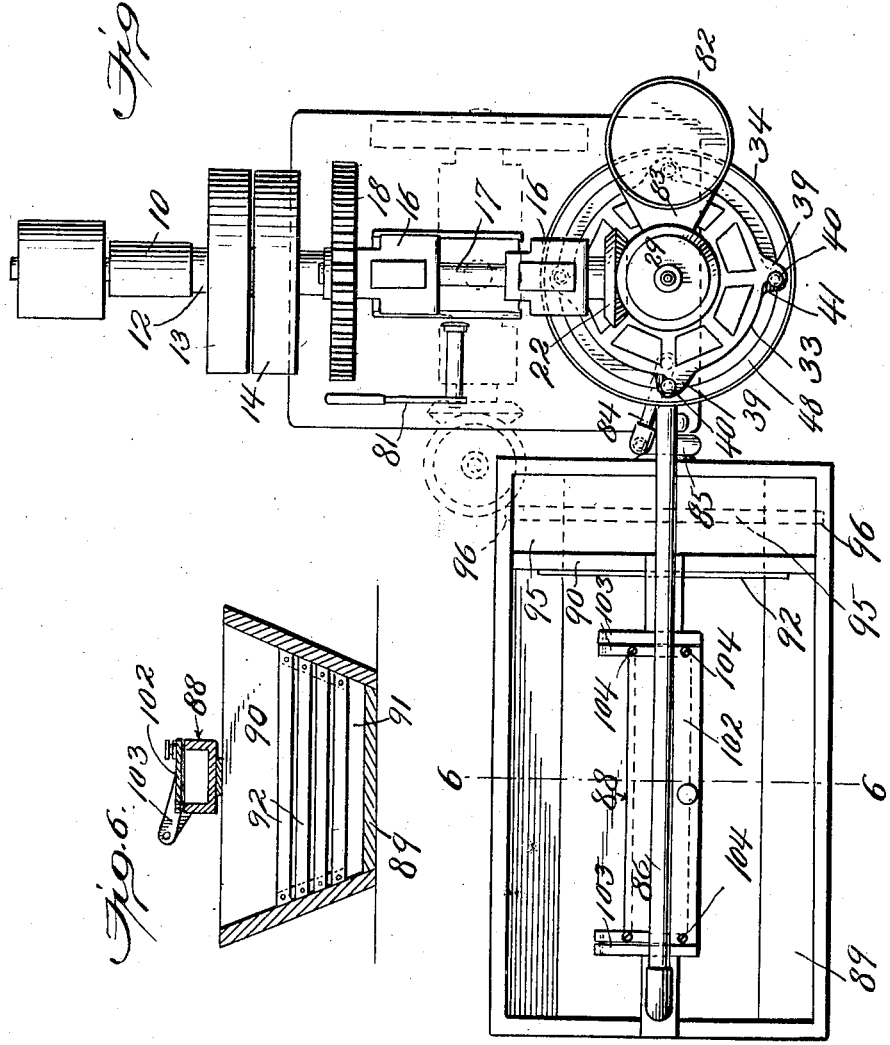
Inventor
Franklin P. Miller
Witness
Chas. D. Hyer.
By
Attorney

UNITED STATES PATENT OFFICE.

FRANKLIN P. MILLER, OF EAST ORANGE, NEW JERSEY.

ICE-CREAM-MAKING MACHINE.

1,352,984.  Specification of Letters Patent.  Patented Sept. 14, 1920.

Application filed June 17, 1918. Serial No. 240,479.

*To all whom it may concern:*

Be it known that I, FRANKLIN P. MILLER, a citizen of the United States, residing at East Orange, in the county of Essex and State of New Jersey, have invented new and useful Improvements in Ice-Cream-Making Machines, of which the following is a specification.

This invention relates to ice cream making machines or apparatus, and consists essentially of features of improvement on the structures disclosed by my prior patents and particularly Patent No. 970,846 dated September 20, 1910.

The main object of the present invention is to provide a novel form of rotating can or cream mixture container with a separable cover and a reversely rotating dasher, agitator or mixer in the can or container together with suspending means for the can or container separably connected to the cover and embodying advantageous features and interlocking and operating means whereby a lower or base support for sustaining the weight of the can or container and its contents and the outer tub or inclosing receptacle is only incidental as a secondary holding means for the can during inactivity, thus reducing the friction and wear of the operating parts to a minimum. A further object of the present invention is to provide a novel form of mechanism for raising the operating and suspending means and locking the same to clear the can and cover and permit ready removal from and application of the cover to the can. A further object of the present invention is to provide the cover of the can with a fixed cream or cream mixture receiving bowl which is depressed a suitable distance into the cover and formed with feed openings that have constant communication with the can for supplying the latter with cream or cream mixture during operation thereof, and thereby avoid the use of centrifugally operated or other form of movable valves. A still further object of the invention is to provide a novel form of brine or liquid freezing mixture supply, circulating and recovery means adapted to successively deliver the liquid freezing mixture to the can, tub or inclosure and from the latter to a confined refrigerant in an economical and effective manner to maintain the mixture in the tub or inclosure unformly at the requisite freezing temperature.

In the drawings:—

Figure 1 is a sectional elevation of a machine or apparatus embodying the features of the invention.

Fig. 2 is a horizontal section taken in the plane of the line 2—2, Fig. 1, with the cream or cream mixture supplying can or receptacle removed.

Fig. 3 is an enlarged transverse vertical section of the can or container and bottom outlet, the inclosing receptacle for the can or container, and the operating gearing and suspending means, a part of the support and the driving mechanism being shown in side elevation.

Fig. 4 is a horizontal section taken in the plane of the line 4—4, Fig. 3.

Fig. 5 is a top plan view of the machine or apparatus.

Fig. 6 is a transverse vertical section taken in the plane of the line 6—6, Fig. 5.

The numeral 5 designates an upright or column having an enlarged base 6 and an upper movable supporting head 7 with a laterally projecting bearing arm 8. The upright or column 5 below the head also has a rearwardly and upwardly projecting bearing arm 9, the upper end of the latter arm being provided with a suitable bearing 10 in line with a bearing 11 on the upright column 5 for drive shaft 12 carrying loose and fast pulleys or band wheels 13 and 14 and a friction disk or other pinion 15. The pulleys or band wheels 13 and 14 are adapted to receive power from any suitable source by means of a suitable band which when moved into engagement with the pulley 14, for instance, will operate the disk or pinion 15 and the can and agitator and correlative mechanism as will be hereinafter explained, and when placed in engagement with the pulley 13, the can and agitator and operating mechanism will be inactive or cease to operate. Supported in suitable bearings 16 on the top of the head 7 is a power transmitting shaft 17 having a frictional wheel or other suitable gear 18 on its rear end which normally engages or meshes with the disk or pinion 15, and a bevel gear 19 of suitable dimension on its opposite end. The arm 8 of the head 7 supports an upright bearing 20 in which a sleeve 21 is rotatably mounted and provided at its lower end with a bevel gear 22 which is held in mesh with the lower portion of the gear 19, the gear 22 having headed studs 23 depending from the lower side thereof. The upper end of the upright bearing 20 is provided with an annular flange 24 standing outwardly therefrom and forming a bearing channel 25 which is fully open at the top and has a steel or other hard metal bearing ring 26 mounted therein. Extending through the sleeve 21 is a vertical countershaft 27 which projects below the bevel gear 22 a suitable distance and is formed with an angular extremity 28. On the upper portion of the shaft 27 a bevel gear 29 is secured as by screw threads 30 (see Fig. 3) and extends over the upper end of the sleeve 21, the flange 24, and channel 25 and meshes with the bevel gear 19 and whereby the said shaft 27 is rotated in a direction reverse to the sleeve 21. To the upper end of the sleeve 21 an angularly flanged bearing annulus 30$^a$ is secured and projects into the channel 25 and engages the hard steel or other metal ring or washer 26, oil being introduced into the channel 25 to fully lubricate the bearing annulus 30$^a$. By means which will be presently explained, the head 7 is mounted for vertical movement or elevation above the upper end of the upright or column 5 and the gearing and sleeve above explained are uniformly movable therewith and, in addition, the arms 8 may carry any suitable form of housing to cover or shield the gearing as in my prior patented structures. The shaft 27 has its upper end projecting above the gear 29 for convenience in assembling and dissociating the several mechanisms. Below the gear 22 a can or cream mixture container 31, an agitator or mixer 32 having suitable blades, a separable cover 33 for the can or cream mixture container, and a brine tank, outer tub or inclosing receptacle 34 are disposed and operatively and in part separably mounted. The can or cream mixture container 31 is of materially less diameter than the outer tank or inclosing receptacle 34 so as to provide ample space for the circulation of the freezing mixture or medium. The agitator or mixer 32 is provided with suitable blades 35 and is disposed centrally within the can or cream mixture container and comprises a central spindle 36 with an upper enlarged end 37 of such length as to project upwardly through the cover 33 and above the top edge of the outer tank or inclosing receptacle 34. The upper enlarged extremity or head 37 of the spindle 36 is formed with an angular socket 38 to receive the lower angular extremity 28 of the shaft 27 and whereby the said spindle and dasher components may be rotated within the can or cream mixture container. The cover 33 of the can or cream mixture container 31 is separable from the latter and is provided with peripheral catch lugs or hooks 39 at regular intervals therearound to engage headed studs 40 carried by lugs or ears 41 surrounding the upper open end of the can or cream mixture container at intervals. At the center of the cover 33 is a depressed cream or cream mixture receiving bowl 42 having a fully open top portion and outlet apertures 43 at regular intervals around the base thereof and whereby the cream or cream mixture may be permitted to regularly and freely flow into the can or container 31 without relying upon valves or centrifugally operated closures to control the supply of the cream or cream mixture to the can and thereby materially reduce the number of necessary operating parts and cost of manufacture. The bowl 42 has a central supporting tube 44 opening through and extending from the bottom upwardly above the top thereof a suitable distance, the upper end of said tube being provided with a flange head 45 with hooks 46 at opposite ends having reversely arranged throats to engage the headed studs or pins 23 depending from the gear 22. The upper end of the tube 44 is also fully open and is removably fitted over a tubular stub 47 depending from the center of the bottom of the gear 22. When the parts are assembled as shown by Fig. 3, the upper end of the head 37 of the agitator or dasher spindle 36 abuts against the end of the stub 47, and the bore of the sleeve 21 continued through the gear 22 and stub 47 registers with the socket 38 in the upper end of said head 37. The supporting tube 44 also provides a bearing for the rotation and stable support of the upper extremity or head 37 of the spindle 36 of the agitator when the latter is in connected driving relation to the shaft 27. The cover 33 with the peripheral catch lugs or hooks 39, bowl 42 and tube 44 having the flange head 45 with end hooks 46 are integral, or practically integral, and reverse rotations of the cover to engage or disengage the lugs or hooks 39 with relation to the studs 40 result in a similar rotation of the flange head 45 and hooks 46 to lock or release the latter head relatively to the studs 23. The throats of the catch lugs or hooks 39 and of the hooks 46 all open outwardly in the same direction so as to facilitate the ready engagement and disengagement of the said hooks with their respective coacting studs. Moreover, the hooks 39 and 46 are so arranged as to remain in engagement with their studs during the operation of the actuating gearing and rotation of the can or container 31 and agitator or dasher 32 therein.

The brine tank, outer tub or inclosing receptacle 34 is fully open at the top 48 and has a lower hopper-shaped bottom 49 with a central opening 50 therethrough. The side wall and bottom 49 are double or preferably comprise inner and outer walls 51 and 52 with an intervening space between them having a filling 53 of cork insulation or other suitable material. The bottom 54 of the can or container 31 is also hopper-shaped and is provided with a central depending neck 55 formed with an intermediate annular shoulder 56 for supporting a removable valve seat 57 over which a spider 58 is disposed to serve as a bearing for the lower end of the spindle 36 and as a guard to limit the upwardly opening movement of a valve 59 normally engaging the valve seat 57. The valve seat 57 has a tubular pendent or neck 60 of less diameter than the neck 55 in which it is located and provides, in conjunction with said neck 55, a space for the insertion and protective overlap of the upper tubular extremity of a spout 61 having a lower laterally opening outlet 62. The upright or column 5 has a lower knee, offset or supporting ledge $5^a$ with a horizontal extension $5^b$. The extension $5^b$ has an opening $5^c$ therethrough, and around the upper margin of this opening is a seat or depression $5^d$ continuing into a circular channel $5^e$ which serves to carry off leakage. In the depression $5^d$, a hard metal thrust ring 63 is seated as clearly shown by Fig. 3, this ring being screwed upwardly on the depending can neck 55. Oil is placed in the said depression and runs off into the channel $5^e$, and the leakage thereof as well as other leakage is taken up by the opening 50 of the bottom 49 of the outer tub or inclosing receptacle 34. The wall around the opening 50 is formed with a recess 64 to receive a suitable package 65 to provide a stuffing-box, and in this box a nut 66 is threaded and removably and adjustably fits in the recess to hold the packing in place to provide a non-leaking joint. Surrounding the neck 55 is an interposed wear sleeve 67 which engages the packing 65 and the nut 66, said sleeve having its lower end movably resting on the ring 63 and is removable and adapted to be replaced by a similar device in the event of excessive wear by first removing the said ring 63. The valve 59 has a depending rod or stem 68 which is slidable in a bearing 69 at the base of the spout 61 and in a bearing arm 70 projecting horizontally from the knee or ledge $5^a$ below the said spout, the rod or stem 68 having a knob or grip 71 on its lower end for operating it. The neck 55 is inserted in the opening $5^c$ of the knee or ledge $5^a$ and, as hereinbefore indicated, an overlapping joint is formed between the lower end of the tubular pendent 60 of the valve seat and the upper end of the spout 61 to insure a positive outlet of the frozen cream into the spout when the valve 59 is opened. It will be understood from the foregoing that, like the structure of ice cream making machine disclosed by Patent No. 970,846, the present improved machine embodies a can having means, or the spout 61 and valve 59, for releasing the frozen cream or other frozen material from the bottom of the can and tub without requiring an operator to put his hand into the can. In the present form of improved machine, however, the can and contents are suspended from the operating gearing and arm 8 of the head 7 during actuation thereof, the knee or ledge $5^a$ and extension $5^b$ serving to receive the weight of the can and its contents only when the can and its cover are detached from the gearing and, therefore, the wear of the thrust ring 63 is reduced to a minimum. The bottom of the brine tank or tub 34 has lower socketed short pillars or posts $34^b$ depending therefrom and rest on bosses $34^a$, dowel pins $34^c$ being interposed between the pillars or posts and the knee or ledge $5^a$ which has sockets $34^d$ to receive said pins. By means of the pillars and posts and dowel pins just explained, the brine tank 34 is held centrally at its lower end with relation to the knee or ledge $5^a$ and undue wearing strain is largely relieved from the can neck and remaining parts adjacent thereto. The brine tank 34 is held firmly at the top by brackets $34^e$ to which it is secured, one of the brackets being shown by Fig. 3.

The head 7 is elevated and lowered by a rod 72 mounted to vertically slide and also to rotate in the column or upright 5. The rod 72 is secured to the head 7 by a pin 73 and has its lower end rotatably attached to a rectangular slide plate 74 movable in a correspondingly shaped way 75 formed in the inner portion of the column or upright 5. The plate 74 has a rod 76 extending through and projecting outwardly from the opposite sides of the inner end thereof to provide studs 77 which loosely project into snail cam grooves 78 of cam disks 79 disposed on opposite sides of the plate 74, as shown by Fig. 4. The cam disks 79 are fixed for unitary or simultaneous operation on a shaft 80 projecting outwardly through the front portion of the column or upright 5 and provided with a crank handle 81. The hooks 46 of the flange head 45 at the upper end of the tube 44 are turned to disengage them from the studs 23, and the crank handle 81 is then moved upwardly and the disks 79 rotated thereby to the right, causing the cam grooves 78 to gradually raise the slide plate 74 and the rod 72 and elevate the head 7 and the gearing supported by said head. The elevation of the head 7 and the gearing carried thereby is continued until the lower end of the shaft 27 is fully disengaged from the socket 38 of the head 37, and the head 7 and gearing are swung to one side to clear the cover 33 and its attachments as well as the top of the can 31 and tub or outer inclosure 34. The cover then may be easily removed to permit access to the interior of the can and, subsequently, when the cover has been re-applied, the head 7 may swing over to bring the operating gearing in place over the cover and can to permit the hooks 46 to be engaged with the studs 23 and the actuation of the can 31 and dasher 32 may then proceed. When the head 7 and gearing are raised and swung to one side as just explained, the gear or disk 18 is separated from the gear or pinion 15 and, consequently, the gearing carried by the head 7 will cease to operate.

The cream or cream mixture or other material to be frozen is supplied to the bowl 42 preferably by a pan or receptacle 82 which is supported on the tub or outer inclosure 34 and has an inner feeding spout 83 resting on the top of the bowl as clearly shown by Fig. 1.

The present improvements also include a refrigerant or brine supplying and circulating attachment whereby the tub or outer inclosure 34 may be supplied with a refrigerant at a regular low temperature with material advantages in thoroughly and expeditiously freezing the contents of the can 31. To the bottom of the tub or outer inclosure 34 a supply pipe 84 is attached and also connected to a suitably operated pump 85. A horizontal member 86 of the return pipe is connected to the top portion of the tub or inclosure 34 and is continued by a vertical or upright member 87 which is connected to one end of a spray box or receiver 88 on the top of a refrigerating trough 89 in which a suitable quantity of ice and salt or other refrigerating medium is disposed. The trough 89 has a vertical partition 90 near one end, said partition being formed with a lower opening 91 having spaced slats 92 fixed thereover to hold the ice or solids of the refrigerant within the main body of the trough. The partition 90 forms a straining outlet chamber 93 with the adjacent end 94 of the trough, this chamber being divided by a partition 95 removably mounted at its ends in grooves 96, as shown by Fig. 5. The partition 95 has a lower opening 97 covered by a wire gauze strainer 98 to prevent the salt or other material from passing beyond said partition. The chamber 93 is provided with a cover 99 which can be readily removed to permit withdrawal of the partition 95 to clear the said chamber for cleaning purposes. The trough end 94 has a lower outlet opening 100 covered with a wire gauze strainer 101 as a further precaution to prevent any of the refrigerating solids or particles passing out from the trough, the pump 85 being connected to the said outlet opening 100. The spray box or receiver 88 has a cover 102 hinged at one side by hinge brackets 103, as clearly shown by Fig. 6, and the free side edge of this cover is provided with adjusting screws 104 which engage the adjacent top edge portions of the box or receiver body to provide a crack between the said cover and box or receiver body for the egress of the overflow of liquid brine or refrigerating material returning to the box. The liquid brine or refrigerating material comes into or is admitted to the box or receiver 88 under the head pressure provided by the height of the pipe member 87 and is forced out through the crack between the cover 102 and the top edge of the body of the box or receiver regularly over the refrigerant in the trough 89 without splashing or dashing in irregular streams. The cover 102 is light enough to be automatically forced open by and proportionately to the pressure accumulated within the box or receiver by the returning brine overflowing into the pipe member 86 from the upper portion of the tub or outer inclosure 34 so that the pipe members 86 and 87 will at no time be fully filled and thereby preventing the liquid or brine from backing up and overflowing over the upper edge of the said tub or outer inclosure. The liquid refrigerating material or brine is regularly forced upwardly into the tub or inclosure 34 by the pump 85 and overflows into the pipe member 86, and by this means a positive circulation of the refrigerating liquid or brine is maintained in the tub or inclosure at a uniformly low temperature in view of the return of said liquid or brine to the trough 89 for re-cooling. This improved refrigerant preparing and supply attachment will be found to be very effective in the performance of its function and avoids the usual construction embodying refrigerating or brine pipes in the tub or inclosure 34 and leaves the latter clear for more direct action of the refrigerant relatively to the can 31 and its contents. Furthermore, this improvede form of refrigerant preparing and circulating attachment provides a more hygienic mechanism generally, as the parts adjacent to the cream can 31 can be kept cleaner and free from unwholesome accumulations and sediment.

I claim as my invention:

1. In an ice cream making machine, the combination with an inclosing tub, a cream containing can rotatably mounted in said tub and having a valve controlled outlet at its lower end formed by a depending collar extending through the bottom of the tub, joint forming devices between said collar and the lower end of the tub and including a wear sleeve removably surrounding the upper portion of the collar, supporting means for the lower end of the tub having an opening therethrough into which the collar projects, a thrust ring on said support engaged by a part of the joint means between the collar and the bottom of the tub, and an outlet spout associated with the lower portion of the collar.

2. In an ice cream making machine, the combination of an inclosing tub, a cream containing can rotatably mounted in the tub and provided with a removable cover, a dasher rotatably disposed in the can, a support over the tub and can and having mechanism for reversely rotating the can and cover and dasher and to which the cover is detachably secured, and supporting means at the bottom of the tub and can for sustaining the weight of the latter when the can and its cover are detached from the mechanism over the can and tub, the can and contents and its cover and the dasher being suspended and supported wholly by the said support and mechanism over the tub and can so long as the can through its cover is connected to said mechanism.

3. In an ice cream making machine, an inclosing tub, a cream containing can mounted in said tub, a cover removably mounted on the can and having a central depressed cream receiving bowl formed with a plurality of apertures near the base thereof that remain constantly open, a dasher within the can, and mechanism for rotating the can and dasher.

4. In an ice cream making machine, an inclosing tub, a cream containing can mounted in said tub, a cover removably mounted on the can and having a central depressed cream receiving bowl formed with a plurality of outlet apertures at the base and a tube opening through the base and also rising above the upper edge of the bowl, a dasher within the can having a spindle with a head removably extending upwardly into said bowl tube, and mechanism for rotating the can and dasher and having a part extending downwardly into said bowl tube and separably engaging said dasher spindle head.

5. In an ice cream making machine, an inclosing tub, a cream containing can rotatably mounted in said tub, a rotatable dasher removably mounted in the can, a support carrying mechanism over the tub and can for rotating the can and dasher, and a cover separably mounted on the can and having a separably disposed elevated head with end centrally fastening devices separably engaging a part of said mechanism for suspending and rotating the can through the medium of the said cover.

6. In an ice cream making machine, an inclosing tub, a cream containing can rotatably mounted in said tub, a dasher removably mounted in the can and having a spindle with an upwardly projecting head, a support carrying mechanism over the tub, can and dasher for reversely rotating the can and dasher, a cover separably mounted on the can and having a central upwardly projecting tube with an upper head flange provided with end fastening devices to separably engage a part of said mechanism; the dasher head removably extending upwardly into the tube and a part of the mechanism projecting downwardly into the tube to operatively and separably engage the dasher head, and means for bodily raising and lowering the support and mechanism.

7. In an ice cream making machine, an inclosing tub, a can rotatably mounted in the tub, a dasher rotatably mounted in the can, a support disposed over the tub and can and having operating mechanism including upper and lower gears, a vertical shaft secured to the upper gear and arranged for separable engagement with the upper extremity of the dasher, the lower gear having an upwardly projecting tubular bearing for said shaft, a sleeve surrounding said bearing and forming a part of the said support, said sleeve having an upper open groove forming an oil channel and provided with a hard metal ring at the bottom thereof, a suspending collar secured over the said tubular bearing and having a flange extending downwardly into said oil channel and engaging the hard metal ring, and a cover separably connected to the can and the said lower gear.

8. In an ice cream making machine, an inclosing tub, a can rotatably mounted in the tub, a dasher removably and rotatably mounted in the can, an upright having a vertically movable and laterally swinging head with an arm carrying shafts and gears for reversely rotating the can and one of the gears, a vertically slidable rod in the upright and having the head secured to the upper end thereof, a slide plate in which the lower end of the rod is secured to rotate, said slide plate having studs at the inner portions of opposite sides, and a shaft having cams within the upright, the cams being provided with grooves engaged by said studs, the shaft being exteriorly operative to raise and lower said head and the operating mechanism carried thereby when the can cover is disengaged therefrom.

9. In an ice cream making machine, the combination of a support having a horizontal knee, an inclosing tank having a bottom with depending posts, centering dowel pins between the said posts and knee, means for securing the top of the tank to the support, a can in the tank having a removable cover and a dasher therein, operating mechanism for elevating and suspending and rotating the can, cover and dasher, and bearing means coördinated with the bottom of the can and knee.

10. In an ice cream making machine, the combination of a support with a knee, an inclosing tank immovably held by portions of said support, a can rotatably mounted in the tank and having a depending neck extending into the knee, a thrust ring held on the can neck and bearing on a portion of the knee, a stuffing-box between the bottom of the tank and can, a removable wear sleeve surrounding the can neck between the latter and parts of the stuffing-box and engaged by the thrust ring, the can having a dasher therein and a removable cover, and mechanism for rotating the can, cover and dasher.

In testimony whereof I have hereunto set my hand in presence of two subscribing witnesses.

FRANKLIN P. MILLER.

Witnesses:
   GRACE E. MILLER,
   OLIVETTE MILLER.